United States Patent
Lech et al.

(10) Patent No.: US 9,719,696 B2
(45) Date of Patent: Aug. 1, 2017

(54) SOLAR RECEIVER CONFIGURATION

(71) Applicant: ALSTOM Technology Ltd, Baden (CH)

(72) Inventors: Christopher J. Lech, Feeding Hills, MA (US); Ronald Girard Payne, West Simsbury, CT (US); John Tweedie, East Windsor, CT (US); Gary Pashko, Ludlow, MA (US); Apurba Kumar Das, Vernon, CT (US); Lin Deng, Avon, CT (US); David McGrane, Chicopee, MA (US); Pedro Inigo, South Windsor, CT (US); Rahul Jayant Terdalkar, East Windsor, CT (US)

(73) Assignee: ALSTOM Technology Ltd., Baden (CH)

( * ) Notice: Subject to any disclaimer, the term of this patent is extended or adjusted under 35 U.S.C. 154(b) by 373 days.

(21) Appl. No.: 14/302,953

(22) Filed: Jun. 12, 2014

(65) Prior Publication Data
US 2015/0362218 A1 Dec. 17, 2015

(51) Int. Cl.
*F24J 2/24* (2006.01)
*F24J 2/07* (2006.01)
*F24J 2/46* (2006.01)

(52) U.S. Cl.
CPC ............... *F24J 2/242* (2013.01); *F24J 2/07* (2013.01); *F24J 2/4647* (2013.01); *F24J 2/244* (2013.01); *F24J 2/245* (2013.01); *Y02E 10/41* (2013.01); *Y02E 10/44* (2013.01)

(58) Field of Classification Search
CPC .... F24J 2/242; F24J 2/07; F24J 2/4647; F24J 2/245; F24J 2/244; Y02E 10/44; Y02E 10/41

USPC ......................................... 122/235.15, 235.31
See application file for complete search history.

(56) References Cited

U.S. PATENT DOCUMENTS

| | | | |
|---|---|---|---|
| 4,245,618 A | 1/1981 | Wiener | |
| 4,485,803 A | 12/1984 | Wiener | |
| 4,512,336 A * | 4/1985 | Wiener | F22B 1/006 122/235.12 |
| 5,862,800 A | 1/1999 | Marko | |
| 6,931,851 B2 | 8/2005 | Litwin | |
| 2003/0041857 A1* | 3/2003 | Marko | F24J 2/07 126/680 |
| 2004/0112374 A1* | 6/2004 | Litwin | F24J 2/07 126/680 |

FOREIGN PATENT DOCUMENTS

| | | |
|---|---|---|
| EP | 0106687 A2 | 4/1984 |
| EP | 2706307 A1 | 3/2014 |

* cited by examiner

*Primary Examiner* — Avinash Savani
*Assistant Examiner* — Rabeeul Zuberi
(74) *Attorney, Agent, or Firm* — Dority & Manning, P.A.

(57) ABSTRACT

A solar receiver configuration (receiver) adapted to include a plurality of receiver heat transfer passes. Each pass includes a plurality of panels. Further, each panel includes a plurality of tubes, tangentially arranged, vertically extending between horizontally placed lower and upper headers. The headers, which are pipe assemblies with closed ends, of adjacent panels are horizontally and vertically offset one to another to form a substantially continuous tube surface. Such continuous tube surface enables solar heating of the fluid flow therefrom in at least a parallel flow arrangement and a serpentine flow arrangement.

5 Claims, 6 Drawing Sheets

SOLAR RECEIVER CONFIGURATION

TECHNICAL FIELD

The present invention relates to a solar central receiver of a concentrated power tower plant, and, more particularly, to an improved panel and header arrangement and orientation of panels comprising a heat transfer surface for a solar central receiver.

BACKGROUND

In a typical arrangement of a concentrated solar power plant, a large field of heliostats is arranged around a solar central receiver (solar receiver) placed on a tower of substantial height, where the heliostats focus direct sunlight on to the solar receiver to provide heat to a heat transfer fluid, which is applied to produce steam to run a turbine and extract work in order to produce electricity. The solar receiver generally includes various vertical panels, each having fluid-carrying vertical tubes arranged between horizontally disposed headers for distribution of fluid into the tubes. Tube panel arrangements for configuring the solar receiver are important to effectively utilize solar flux without any spillage or leakage (solar energy not received on the heat transfer surface so as to be absorbed into the heat transfer medium) and proper functioning of the solar receiver.

In one arrangement each panel of the heat transfer surface comprises a flat vertical tube panel between inlet and outlet headers, wherein the headers are positioned in a plane common to the centerline of the tube panel surface. In such an arrangement the adjacent panels of the solar receiver are positioned with spacing therebetween the edge tubes of adjacent panels to accommodate the length of the panel headers. The size of the spacing between panels' edge tubes is such that the thermal expansion of the panels is insufficient to close the spacing between panels' edge tubes, resulting in spillage or leakage of solar flux, possibly causing damage of solar receiver's internal components.

Such problem may be seen to be addressed in U.S. Pat. No. 6,931,851B1 (US'851), where the constant spacing between the adjacent panels has been addressed by providing a solar receiver with inboard headers with alternative designs of staggered and beveled. However, to one knowledgeable in the art it will be obvious that in the process of creating such inboard header arrangements other issues, such as, manufacturing limitations, fluid drainage restrictions, complications in erection of the receiver, maintainability of the receiver, are added to the design.

Accordingly, there exists a need for an improved solar receiver, which may be capable of maintaining a constant spacing of the panel arrangements while balancing other constrains and issues as discussed above and provides additional features and advantages.

SUMMARY

The present disclosure describes a solar receiver with an improved header and panel design that will be presented in the following simplified summary to provide a basic understanding of one or more aspects of the disclosure that are intended to overcome the discussed drawbacks, but to include all advantages thereof, along with providing some additional advantages. This summary is not an extensive overview of the disclosure. It is intended to neither identify key or critical elements of the disclosure, nor to delineate the scope of the present disclosure: Rather, the sole purpose of this summary is to present some concepts of the disclosure, its aspects and advantages in a simplified form as a prelude to the more detailed description that is presented hereinafter.

An object of the present disclosure is to describe a solar receiver with improved panel and header design, which may be capable of maintaining a constant spacing of the panel arrangements while balancing other constraints, such as, minimum receiver diameter, ease of manufacturing and erection, full drainability and reduced bending stress. Further, an object of the present disclosure is to describe a solar receiver with improved panel and header design, which may be convenient to use in an effective and economical way in solar receivers that use water, steam, molten salt and other heat transfer fluids. Various other objects and features of the present disclosure will be apparent from the following detailed description and claims.

The above noted and other objects, in one aspect, may be achieved by a solar receiver configuration (receiver) adapted to include a plurality of receiver heat transfer passes (pass) arranged to form a substantially continuous heat transfer surface. Each pass includes a plurality of panels. Further, each panel includes a plurality of tubes, tangentially arranged, vertically extending between horizontally placed lower and upper headers. The headers, which are pipe assemblies with closed ends, of adjacent panels are horizontally and vertically offset one to another to form a substantially continuous tube surface. Such continuous tube surface enables solar heating of the fluid flow therefrom in at least a parallel flow arrangement and a serpentine flow arrangement. Such arrangement of the receiver enables constant spacing of the panel arrangements in the minimum receiver diameter.

In one arrangement of the receiver, adjacent headers are adapted to be disposed at minimum vertical distance between top and bottom curvatures thereof. Further, the adjacent headers are adapted to be disposed at a minimum horizontal distance between centerlines of the adjacent headers, allowing an edge tube of one of the panel to clear an outermost edge of the header of the adjacent panel. Such adjacent header arrangement enables convenient assembly and dis-assembly of the plurality of panels.

In one arrangement of the receiver, each panel having a vertically offset header is adjacent to, on each side, a panel having a horizontally offset header forming horizontally and vertically offset adjacent headers, one to another. The panels having the upper header vertically offset is adapted to include a lower header horizontally offset, to balance the characteristic pressure drop of the adjacent panels having a similar combination of vertically and horizontally offset headers for each panel assembly.

In one arrangement of the receiver, at least one tube of the plurality of tubes in each panel is assigned to be coupled at a bottom-most portion of the respective upper header. Such a tube allows self-draining of the fluids from each of the plurality of panels making the panels fully drainable.

In one arrangement of the receiver, the plurality of tubes comprises a predetermined numbers of bent tube assemblies adapted to be bent two-dimensionally at proximate to each of the lower and upper headers enabling equal fluid distribution to each tube within the panel enabling convenient manufacturing and production quality control, and enabling simplified spare part inventory and unit repair.

These together with the other aspects of the present disclosure, along with the various features of novelty that characterize the present disclosure, are pointed out with particularity in the present disclosure. For a better understanding of the present disclosure, its operating advantages, and its uses, reference should be made to the accompanying drawings and descriptive matter in which there are illustrated exemplary embodiments of the present disclosure.

BRIEF DESCRIPTION OF THE DRAWINGS

The advantages and features of the present disclosure will be better understood with reference to the following detailed description and claims taken in conjunction with the accompanying drawing, wherein like elements are identified with like symbols, and in which:

Like reference numerals refer to like parts throughout the description of several views of the drawings.

DETAILED DESCRIPTION

For a thorough understanding of the present disclosure, reference is to be made to the following detailed description, including the appended claims, in connection with the above described drawings. In the following description, for purposes of explanation, numerous specific details are set forth in order to provide a thorough understanding of the present disclosure. It will be apparent, however, to one skilled in the art that the present disclosure can be practiced without these specific details. In other instances, structures and apparatuses are shown in block diagrams form only, in order to avoid obscuring the disclosure. Reference in this specification to "one embodiment," "an embodiment," "another embodiment," "various embodiments," means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but may not be of other embodiment's requirement.

Although the following description contains many specifics for the purposes of illustration, anyone skilled in the art will appreciate that many variations and/or alterations to these details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure. The terms "a" and "an" herein do not denote a limitation of quantity, but rather denote the presence of at least one of the referenced item.

Figure 1:
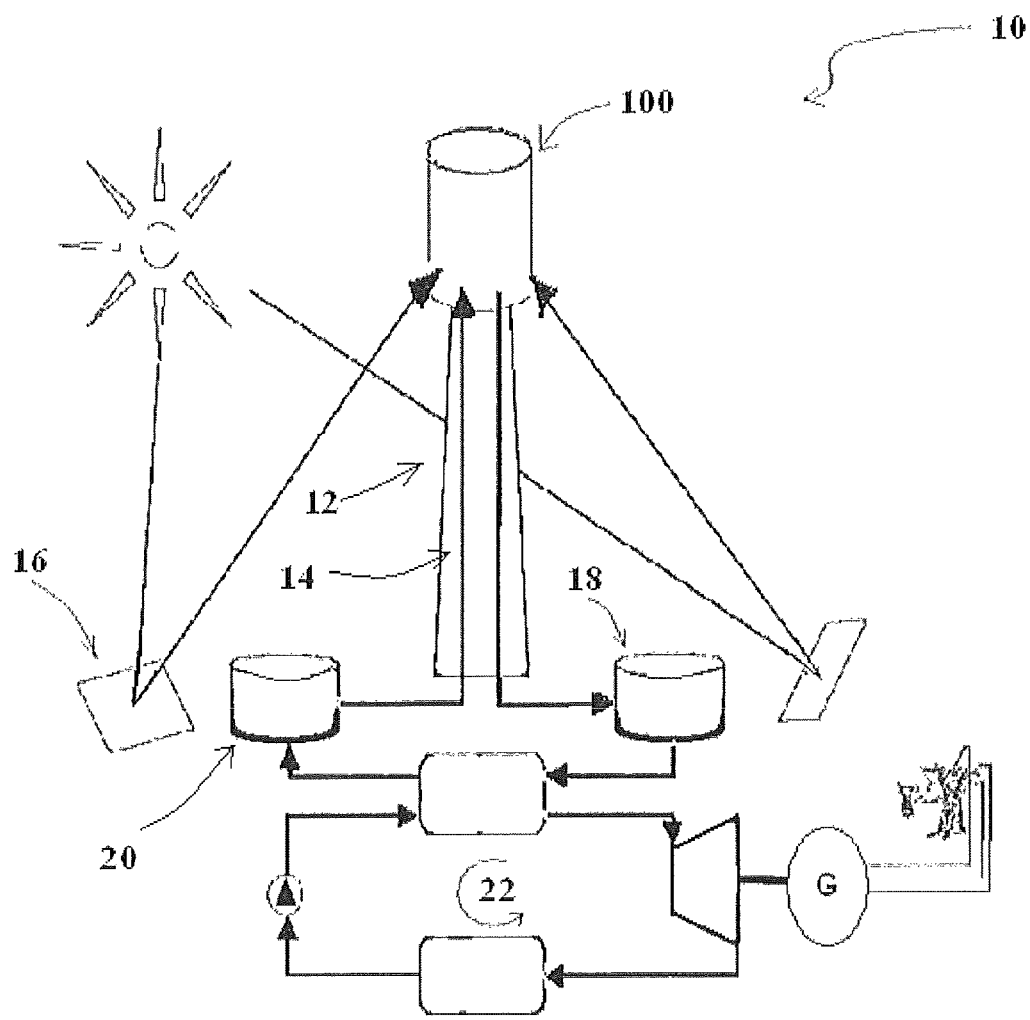
FIG. 1 illustrates an example of a concentrated solar power plant, in accordance with an exemplary embodiment of the present disclosure.

Referring now to FIG. 1, an example of a concentrated solar power plant 10 with a solar receiver 100 is illustrated, in accordance with an exemplary embodiment of the present disclosure. The power plant 10 includes a concentrated solar tower assembly 12 having a tower structure 14, where the solar receiver 100 is placed at the top. On the solar receiver 100, solar rays are concentrated from solar field comprised of heliostats 16 for collecting thermal energy in a heat transfer fluid. The power plant 10 may further include hot and cold storage tanks 18, 20, respectively, and a Rankine cycle power block 22 to generate electricity. The molten salt fluid at the solar receiver 100 is being heated through focusing the sunlight via heliostats 16. The hot salt is stored in the hot storage tank 18, at temperature of about 565° C., and after thermal energy thereof is being utilized by the cycle 22 for producing electricity through generator 'G', it is stored in the cold storage tank 20, at temperature of about 290° C., from where it is further sent to the solar receiver 100 to be reheated. Although FIG. 1 is depiction of molten salt solar power plant configuration, however without departing from the scope of the present disclosure, the invention described in this disclosure is open to other solar power plant configuration.

In as much as the construction and arrangement of the power plant 10 with the solar receiver 100 along with said other components are all well-known to those skilled in the art, it is not deemed necessary for purposes of acquiring an understanding of the present disclosure that there be recited herein all of the constructional details and explanation thereof. Rather, it is deemed sufficient to simply note that as shown in FIGS. 2 to 4B, various diagrams depicting the portions of the receiver panels with improved panel arrangement design that may be successfully utilized in relation to any solar operated power plants in an effective and economical way in the solar receiver using water, steam, molten salt and other heat transfer fluids. Further, it should be understood that the solar receiver may include a variety of components for performing their assigned purpose, and only those components are shown that are relevant for the description of various embodiments of the present disclosure.

Figure 2:
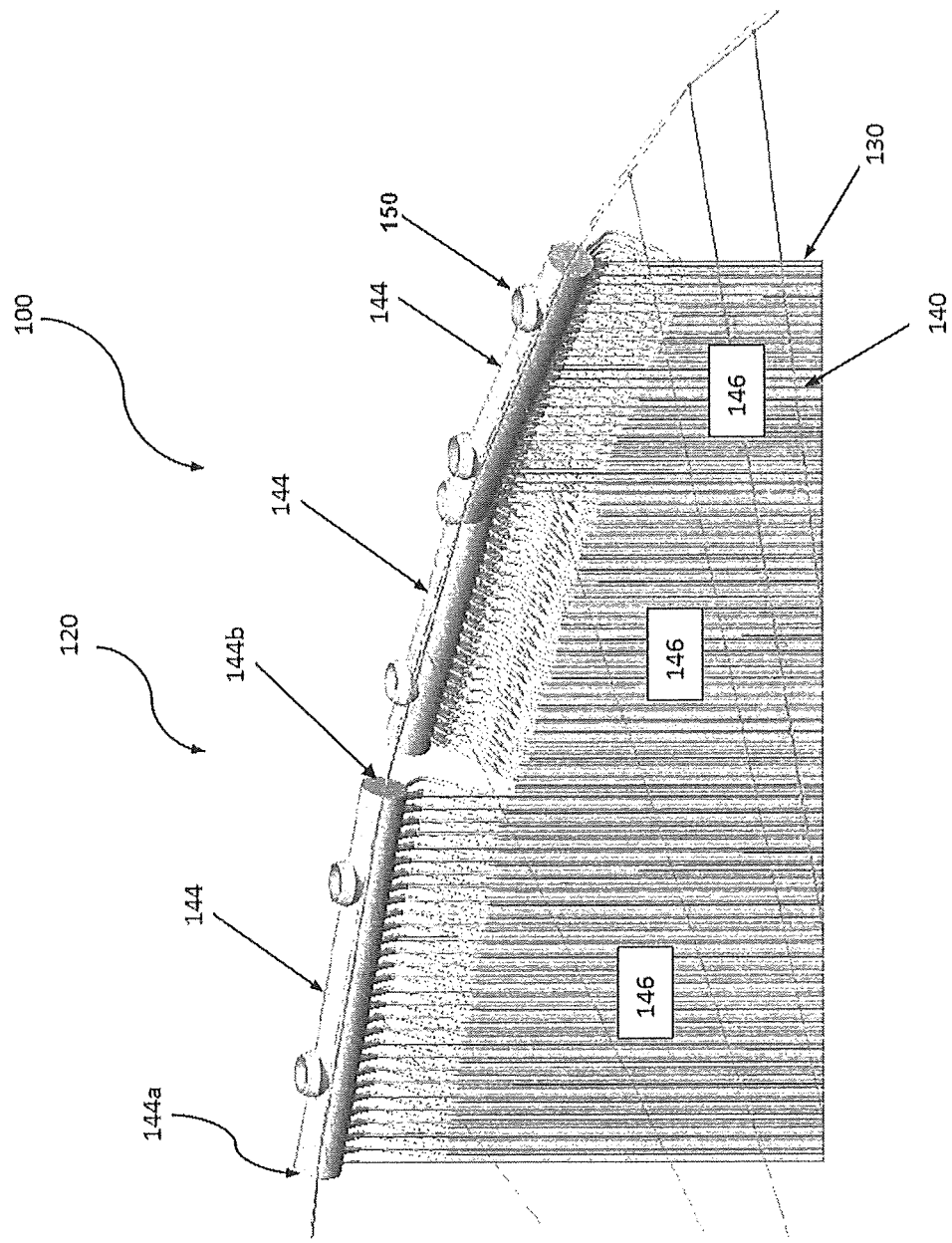
FIG. 2 illustrates an example solid depiction of a portion of a solar receiver, in accordance with second exemplary embodiment of the present disclosure.
Figure 3A:
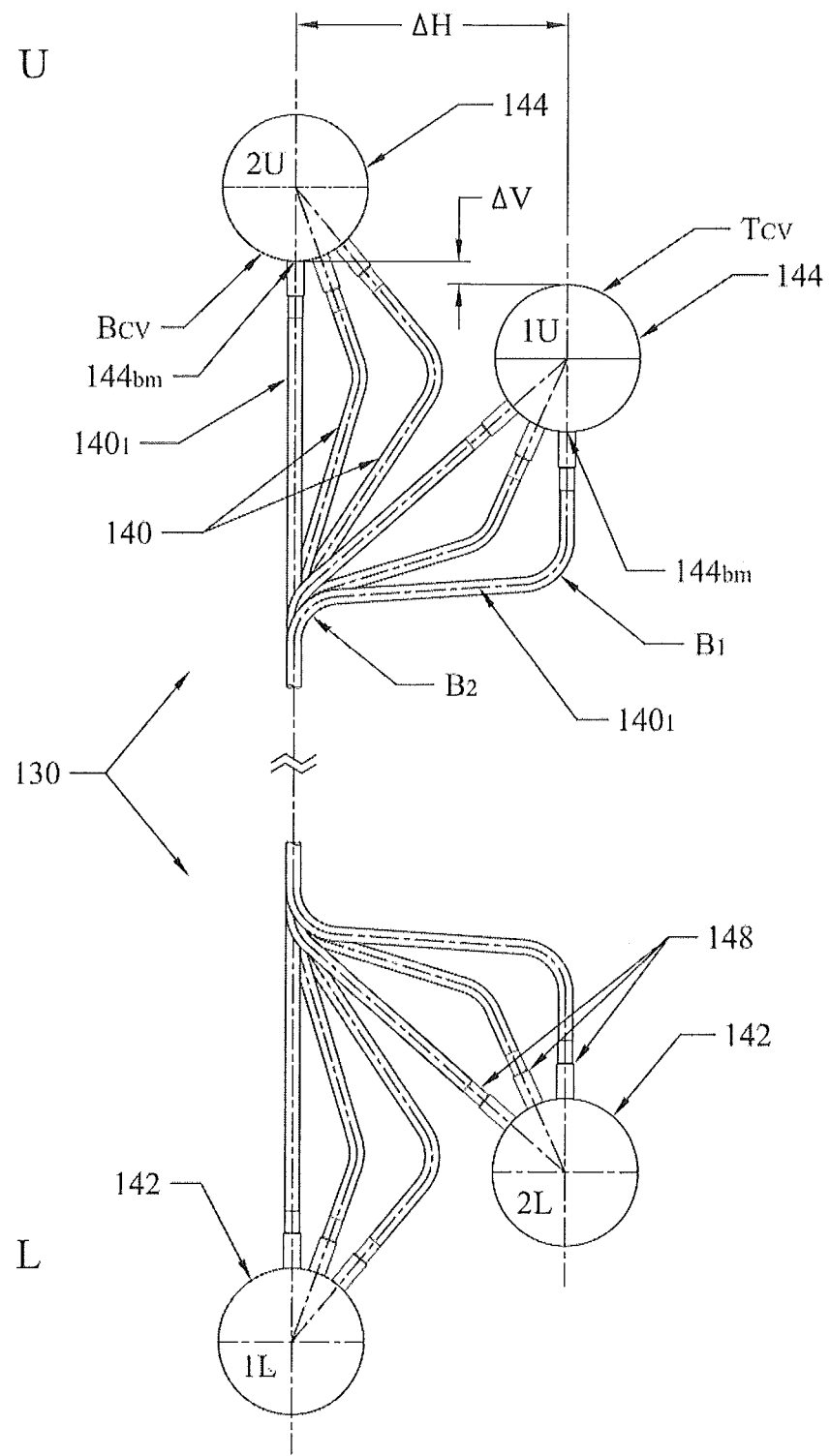
FIGS. 3A and 3B illustrate example diagrams of receiver panels and an improved header design pattern, in accordance with third exemplary embodiment of the present disclosure.
Figure 3B:
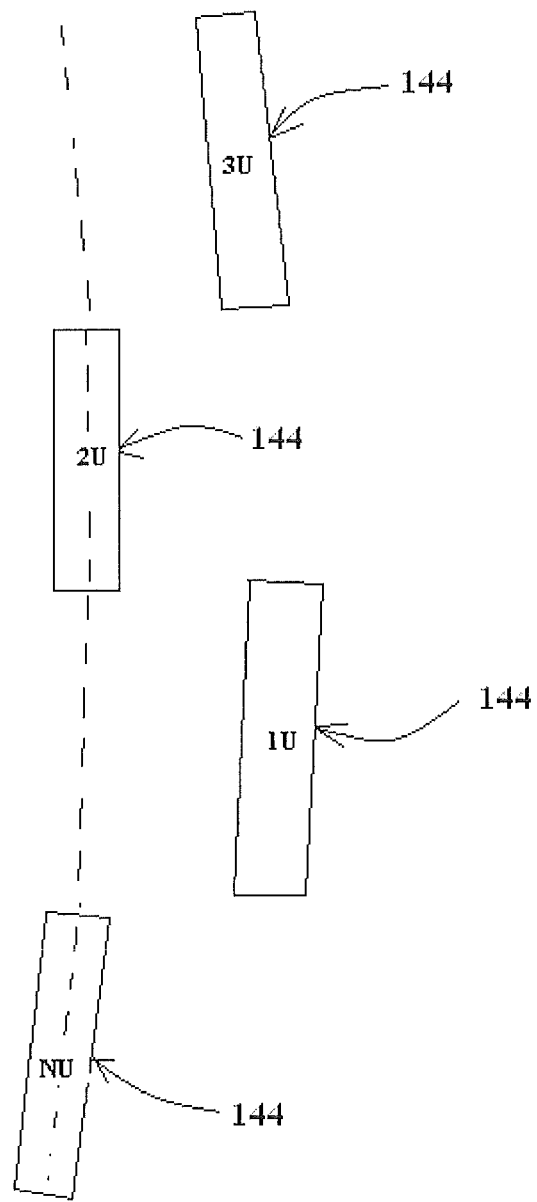

As shown in FIGS. 2, 3A and 3B and described in conjunction with each other, is the solar receiver 100 and its essential components. Specifically, FIG. 2 is an example solid depiction of a portion of the solar receiver 100. FIG. 3A is a side elevation view of a panel arrangement of the solar receiver 100. FIG. 3B is a top plane view of a panel arrangement of the solar receiver 100. The solar receiver 100 includes a plurality of receiver heat transfer passes 120 (hereinafter referred to as 'HT pass 120'). The HT passes 120, which define flow directions of the fluid may be arranged to configure the solar receiver 100 of varying size and shapes, such as, circular, oval, square, etc. Each HT pass 120 includes a plurality of panels 130. Further, each panel 130 includes a plurality of tubes 140, tangentially arranged, vertically extending between horizontally placed lower 142 and upper headers 144 to form a substantially continuous tube surface 146. Such continuous tube surface 146 enables solar heating of the fluid flow therefrom in a parallel flow arrangement or a serpentine flow arrangement or in any other combination. In one embodiment, the upper headers 144 may include various header nipples 148 configured perpendicular to respective headers 144 surfaces. Each header nipple 148 is coupled to a respective tube 140 to enable fluid source connection to supply fluid to the plurality of tubes 140 via the respective headers 144 for the solar heating. In one of the additional embodiment, headers 142 and 144 may include nozzle connection ports 150 to enable connection between the respective headers and manifolds to supply and exit of the fluid from the panels 130, as known in the art.

In one arrangement of the solar receiver 100, the plurality of tubes 140 comprises a predetermined number of bent tube assemblies. Without limiting the bent tube designs, in one exemplary embodiment, the tubes 140 are adapted to be bent two-dimensionally at proximate to each of the lower 142 and upper 144 headers enabling equal fluid flow distribution to each tube 140 within the panel 130. Specifically, the two dimensional bend of the tubes 140 are like that includes maximum of two bends, such as B1 and B2, (as shown in FIG. 3A) in the tube 140 at proximate to each of the lower 142 and upper 144 headers. Further, apart from some bent tubes, some tubes may be straight, without any bend. For configuring the panel 130, predetermined numbers of straight and bent tubes 140 may in any suitable manner as found appropriate be arranged between the headers 142, 144 while configuring the panel 130. The two-dimensional tube bends enable convenient manufacturing and production quality control, and enabling simplified spare part inventory and unit repair for the production of the solar receiver 100. Further at least one tube, such as a tube $140_1$ (as shown in FIG. 3A) of the plurality of tubes 140 in each panel 130 is assigned to be coupled at a bottom-most portion $144_{bm}$ of the respective upper headers 144. Such tube $140_1$ allows self-draining of the fluids from each of the plurality of panels 130 making the panels fully drainable.

Further, the headers 142, 144 between which the continuous tube surfaces 146 formed from the plurality of the tubes 140 of each panel 130 are adapted to be arranged in a particular manner with respect to each other. Specifically, the headers 142, 144 of adjacent panels 130 are horizontally ($\Delta$H) and vertically ($\Delta$V) offset one to another at distal ends of the substantially continuous tube surface 146. Each panel 130 includes the vertically offset ($\Delta$V) header 142, 144, which is adjacent to a panel having the horizontally offset ($\Delta$H) header 142, 144 forming horizontally and vertically offset ($\Delta$H,$\Delta$V) adjacent headers 142, 144, one to another, on each side: upper 'U' and lower 'L' of the solar receiver 100. The panel, such as 130, having the upper header 144 vertically offset ($\Delta$V) is adapted to include the lower header 142 horizontally offset ($\Delta$H), to balance the characteristic pressure drop of the adjacent panels 130 having a similar combination of vertically and horizontally offset headers.

This can be understood more clearly by reference to FIGS. 3A and 3B, where one panel, such as the panel 130, includes upper 1U and lower 1L headers indicating the upper 'U' and lower 'L' of the solar receiver 100. Similarly, another panel, such as the panel 130, includes upper 2U and lower 2L headers indicating the upper 'U' and lower 'L' of the solar receiver 100. The upper header 1U is horizontally ($\Delta$H) and vertically ($\Delta$V) offset with respect to the adjacent upper header 2U and vice versa. Further, the upper header 2U is considered to be horizontally offset ($\Delta$H) and vertically offset ($\Delta$V) with respect to the upper header 3U. Similar arrangement is with the lower side of the solar receiver 100. Such an arrangement of the headers 142, 144 enables formation of alternate in-line (with respect to the tube surface 146) and out-ward (with respect to the tube surface 146) staggered header arrangement of the upper 'U' and lower 'L' side of the solar receiver 100. FIG. 3B illustrates the top plane view of such alternate horizontally ($\Delta$H) and vertically ($\Delta$V) offset headers arrangement of the solar receiver 100, which is shown to include various headers 1U, 2U, 3U . . . NU (where 'N' is the last in a series of panels) for understanding purpose.

In one embodiment of the present disclosure, the headers 142, 144 are configured of cylindrical pipe assemblies with closed ends, as depicted for example with respect to the header 144 with closed ends 144a, 144b, in FIG. 2. However, without departing from the scope of the present disclosure various other configurations of the headers and ends thereof may be possible and may be incorporated from time to time and shall be considered to be included within the scope of the present disclosure.

Further, in one essential embodiment, adjacent headers (upper and lower) 142, 144 are adapted to be disposed at minimum vertical distance ($\Delta$V) between top $T_{CV}$ and bottom $B_{CV}$ curvatures (as seen in FIG. 3A) thereof. However, without departing from the scope of the present disclosure, such vertical distance ($\Delta$V) may be specified as per the requirement of the system to perform in an efficient and economical manner.

Figure 4A:
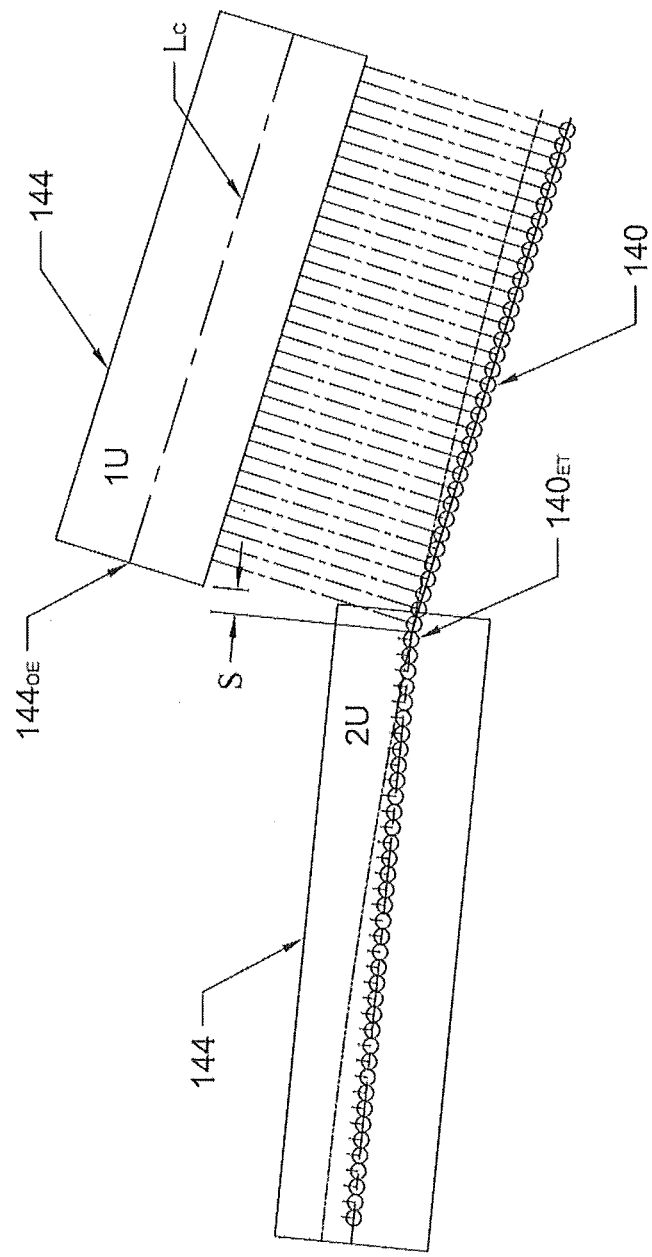
FIGS. 4A and 4B illustrate example line diagrams of receiver panels and an improved header design clearance with respect to adjacent headers, in accordance with third exemplary embodiment of the present disclosure.
Figure 4B:
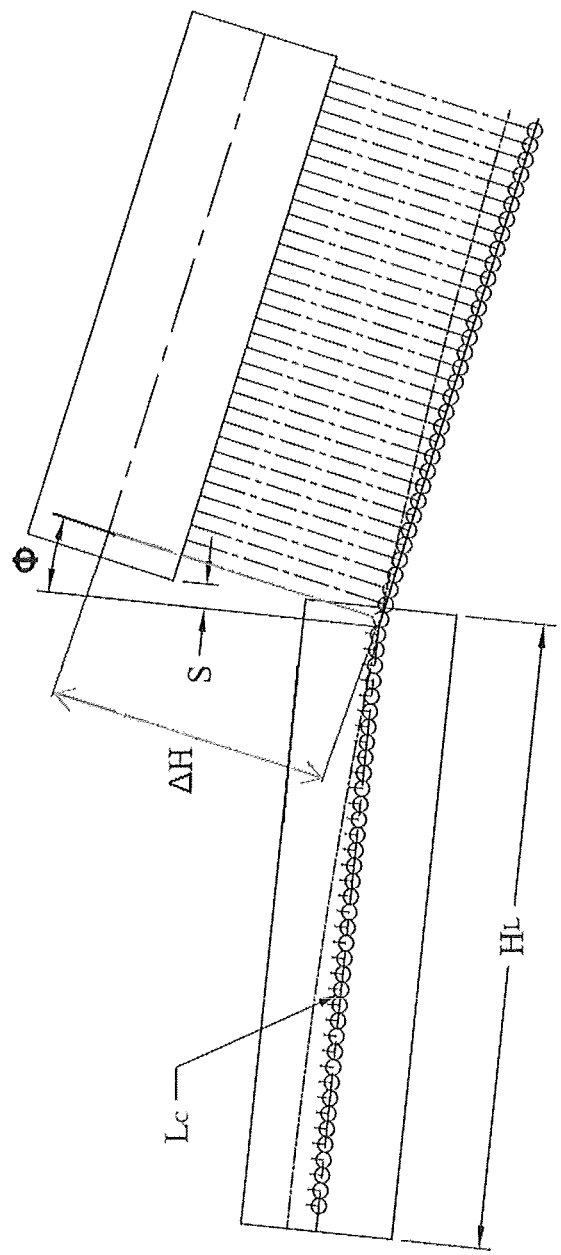

Referring now to FIGS. 4A and 4B, described in conjunction with FIGS. 3A and 3B, the adjacent headers 142, 144 apart from being disposed at minimum vertical distance ($\Delta$V) between top $T_{CV}$ and bottom $B_{CV}$ curvatures are also adapted to be disposed at a minimum horizontal ($\Delta$H) distance between centerlines LC of the adjacent headers 142, 144, allowing an edge tube $140_{ET}$ of one of the panel to have a suitable clearance 'S' with an outermost edge $144_{OE}$ of the header (1U) of the adjacent panel. To obtain such clearance 'S' between the edge tube $140_{ET}$ of one of the panels and the outermost edge $144_{OE}$ of the header (1U) of the adjacent panel, as shown in FIG. 4B, the parameters such as the overall length of each header (HL), the angle of orientation ($\Phi$) and appropriate horizontal offset ($\Delta$H) are responsible. With such clearance 'S' between the panel edge tube $140_{ET}$ of one of the panels and the outermost edge $144_{OE}$ of the header (1U) of the adjacent panel convenient assembly and dis-assembly of the plurality of panels may be achieved.

The invention of the present disclosure is advantageous in various scopes. Such solar receiver with improved panel arrangement design may be capable of minimizing the gap between edge tubes of adjacent panels while balancing other constraints, such as, minimum receiver diameter, ease of manufacturing and erection, full drainability and reduced bending stress. Specifically, simple two dimensional tube bends for the connection between the header and heat transfer surface minimizes manufacturing costs associated with other complicated tube bends, such as three dimensional bends. Placement of at least one tube at the bottom of the header guarantees substantially complete drainage of fluids, minimizing the possibility of blockage due to heat transfer fluid freeze, in one example. Further, substantially smaller header length in the solar receiver reduces material and handling cost as the header nipples can be placed very close to the header end caps. Further, supportive headers arrangement minimizes sustained stress on the header nipples. Furthermore, clearance between the edge tube of one of the panel and the outermost edge of the header of the adjacent panel enables convenient assembly and dis-assembly of the plurality of panels. Moreover, the solar receiver with improved header and panel design may be convenient to use in an effective and economical way in solar receiver using water, steam, molten salt and other heat transfer fluids. Various other advantages and features of the present disclosure are apparent from the above detailed description and appendage claims.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present disclosure.

What is claimed is:

1. A solar receiver configuration, comprising:
    a plurality of receiver heat transfer passes, each pass having a plurality of panels enabling fluid flow therefrom; and
    each of the plurality of panel having a plurality of tubes, tangentially arranged, vertically extending between horizontally placed lower and upper headers, wherein the headers, pipe assemblies with closed ends, of side-by-side adjacent panels are horizontally and vertically offset one to another to form a substantially continuous tube surface to enable solar heating of fluid flow therefrom in at least a parallel flow arrangement and a serpentine flow arrangement;
    wherein each panel having a vertically offset header is adjacent to, on each side, a panel having a horizontally offset header to form horizontally and vertically offset adjacent headers, one to another;
    wherein at least one of the panels having the upper header vertically offset is adapted to comprise the lower header horizontally offset, to balance the characteristic pressure drop of the adjacent panels having a similar combination of vertically and horizontally offset headers for each panel assembly.

2. The solar receiver configuration as claimed in claim 1, wherein adjacent headers are adapted to be disposed at minimum vertical distance between top and bottom curvatures thereof to enable convenient assembly and dis-assembly of the plurality of panels.

3. The solar receiver configuration as claimed in claim 1, wherein the adjacent headers are adapted to be disposed at a minimum horizontal distance between respective centerlines of the adjacent headers, allowing an edge tube of one of the panel to clear an outermost, near-side edge of the header of the adjacent panel to enable convenient assembly and dis-assembly of the plurality of panels.

4. The solar receiver configuration as claimed in claim 1, wherein at least one tube of the plurality of tubes in each panel is assigned to be coupled at a bottom-most portion of the respective upper header to allow self-draining of the fluids from each of the plurality of panels.

5. The solar receiver configuration as claimed in claim 1, wherein the plurality of tubes comprises a predetermined number of bent tube assemblies adapted to be bent two-dimensionally at proximate to each of the lower and upper headers enabling equal fluid distribution to each tube within the panel.

* * * * *